April 8, 1947.                I. S. BRUMAGIM                2,418,620
                              ROTARY SHAFT SEAL
                              Filed Nov. 13, 1945
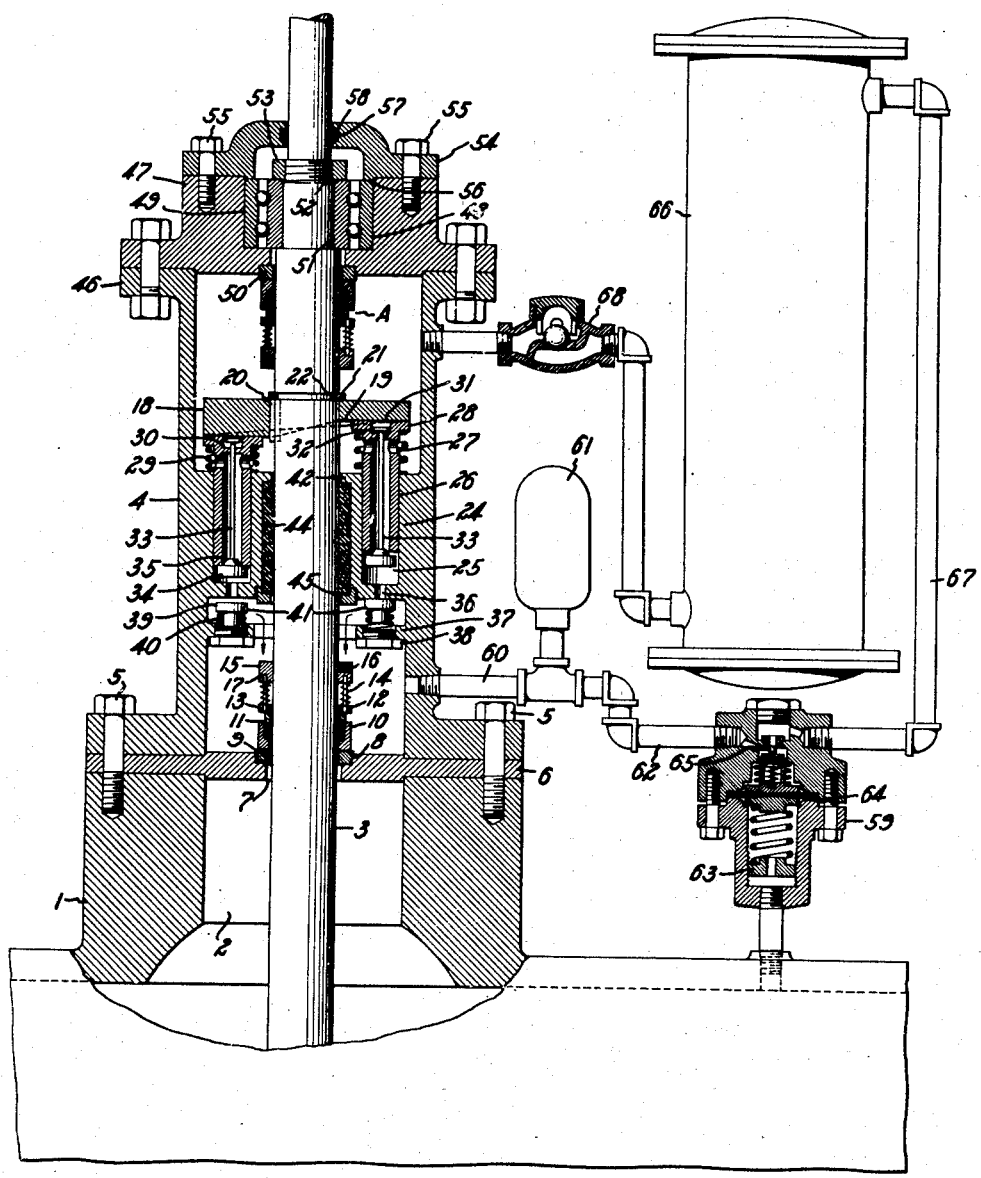
Inventor:
Ivan S. Brumagim
Pierce + Scheffler
By
Attorneys.

Patented Apr. 8, 1947

2,418,620

UNITED STATES PATENT OFFICE 2,418,620

ROTARY SHAFT SEAL

Ivan S. Brumagim, Warren, Pa.

Application November 13, 1945, Serial No. 628,262

9 Claims. (Cl. 286—19)

This invention relates to an improved apparatus for sealing rotating shafts in pressure vessels.

An object of this invention is the provision of an improved seal for rotating shafts passing through the walls of pressure vessels whereby the pressure on each side of the sealing means is substantially equalized.

Another object of this invention is to provide a novel apparatus for continuously pumping a pressure equalizing fluid through a shaft housing between shaft packing seals mounted in the adjacent ends of the housing.

Still further objects of the invention will be apparent from the following description of the invention, hereinafter set forth and illustrated in the accompanying drawing, in which the single figure is an elevational view in partial section of a preferred embodiment of the apparatus.

Referring to the drawing for a more detailed description of the invention, it is to be noted that 1 represents a fragmentary upper section of the pressure vessel provided with an enlarged opening at 2 to permit passage therethrough of the agitator shaft 3. The housing or chamber, designated generally at 4, supports the rotating agitator shaft and is adapted to receive and support the elements necessary to a proper functioning of the apparatus.

The housing is mounted on the pressure vessel by way of studs 5. An annular plate 6 is interposed between the lowermost end of the housing and the pressure vessel, said plate being perforated at 7 and provided with a recessed portion 8 adapted to receive the annular carbon insert 9. The carbon insert 9 does not fit tightly against the periphery of the agitator shaft as it is not intended to provide a seal between the pressure vessel and the lowermost oil chamber of the pump housing but rather as a support for the sealing means now to be described.

An annular sealing ring 10, which forms a part of a packing gland is so mounted on the shaft 3 that its outer face bears against the insert 9 and it provides a support for the shaft packing 11. The gland ring 12 is provided with a plurality of sockets 13, and is maintained under compression by the springs 14 which are interposed between it and collar 15 mounted to rotate with the shaft 3 by set screws 16. Both the collar 15 and gland ring 12 have the same number of sockets in their face portions and are provided with pins 17 which maintain the compression springs in proper position. It will be apparent that the sealing ring 10 and all of its cooperating parts rotate as a unit with the agitator shaft 3.

Adjacent the seal the housing encloses a pumping mechanism which continuously circulates the oil through the system during rotation of the agitator shaft. A swash plate 18, having a cammed lower face portion 19, is affixed to the agitator shaft by means of a key 20 and is prevented from moving axially of the shaft by a split ring 21 which is seated in an annular recess in the shaft, as shown at 22. The cam face 19 of plate 18 bears against the ends of a plurality of pump pistons next referred to.

It will be noted that the portion 24 of the pump housing is provided with a plurality of axially extending cylindrical bores 25 which serve as cylinders. Each cylinder 25 is provided with a hollow piston 26 ported transversely near its top portion, as at 27, to permit access of the oil to the center thereof for pumping purposes; each piston being provided with a laterally projecting rim 28 and adapted to receive a spring 29 which is disposed about the outer periphery thereof. The bottom portions of these springs rest on the upper face portion of the cylinder and urge the piston into contact with the cam face 19 of plate 18. The pistons are provided with a shoulder 30 having a central aperture 31 therethrough. The head 32, carried by the elongated primary check valve stem 33, is positioned in the recess provided between the shoulder and the top of the piston, sufficient clearance being provided in said recess to permit relative longitudinal movement of the head portion 32. The check valve foot 34 is enlarged and of ample size to seal the lower end of the piston during the compression stroke as will be explained hereinafter. The foot portion is provided with an offset face portion 35 to which the valve stem may be affixed in any well-known manner, as by soldering, welding, or threaded engagement. The lower extremity of cylinder 25 is ported as at 36 to permit passage of the oil from the upper to the lower chamber during the compression stroke. Ample clearance is provided between the agitator shaft and the necked-in portion 37 to permit free passage of the oil under compression, as designated by arrows. This necked-in portion is provided with a plurality of apertures which extend axially of and in line with the cylinder ports 36, said apertures being internally screw-threaded so as to permit entry of a plug 38. The secondary check valve 39 has a stem of reduced diameter which is adapted to receive a spring 40 therearound, said spring being inserted between the rim 41 and the plug 38, to urge the valve into closed position. When piston 26 is under compression, check valve 39 is depressed to permit passage of the oil under compression. It is also to be noted that there are as many primary and secondary check valves as there are cylinder openings to be closed.

An inwardly extending flange 42 is provided at the upper extremity of cylinder 25 and spaced therefrom is an externally screw-threaded collar 45. Between the flange and the collar are positioned a multiplicity of annular-shaped packing elements 44. It is not intended nor is it necessary that this packing be pressure-tight. The upper end of the pump chamber is provided with a flange 46 to which the thrust bearing housing 47 is bolted in any convenient manner. This housing is recessed as at 48 and adapted to receive the thrust bearing 49 and carbon insert 50, respectively. The rotary seal, generally designated as A, is identical in structure and function to that located adjacent the bottom of the pump chamber except that the parts thereof are arranged in reverse order, and for this reason it is unnecessary to repeat the description thereof.

The periphery of the agitator shaft is turned down as at 51 to provide a seat for the inner race of the thrust bearing 49. In juxtaposition to the seat, the shaft is provided with threads 52 to which is applied a nut 53 to prevent any longitudinal displacement of the bearing. The cap element 54, which is bolted to the thrust bearing housing as at 55, is provided with a depending cylindrical flange portion 56 which rests on the outer race of the thrust bearing. Cap 54 is provided with an annular recess 57 to which is applied any well-known or preferred grease sealing means as illustrated at 58.

A pressure regulating valve 59 is mounted on the pressure vessel adjacent the pump housing 4, and is illustrated in the lower right-hand corner of the drawing. The fluid which leaves the housing by way of pipe 60 passes immediately to an air cushioning device 61 which eliminates, or substantially reduces, the vibrating or pulsing action of the pistons. Thence, the fluid passes to the regulator 59 through pipe 62. This device is provided with spring-pressed regulating means 63 which permits necessary adjustments to be made relative to the pressure on the diaphragm 64 thereby allowing the pressure in the lower chamber of the housing to be built up sufficiently that it may be equal to or even greater than that in the pressure vessel. The ball check valve 65, which is positioned on the opposite face of the diaphragm, is urged into closed position and is only opened as a result of the surging fluid which is pumped from the lower chamber to and through the regulator. The fluid, upon leaving the regulator, passes upwardly through pipe 67 into the cooling chamber 66 where its temperature is substantially reduced before being returned to the pump housing.

The conventional ball check valve 68 is interposed in the line between the entrance end of the housing and the cooling tank to furnish a line-stop and thereby eliminate reverse flow of the oil from the housing back to the cooling chamber. It also permits the fluid in the line between the check valve and pump to be maintained under a constant pressure after the agitator shaft has ceased to rotate.

The invention is not limited to the particular form or arrangement shown and described by way of illustration, but broadly comprises shaft sealing means including sealing elements spaced along the axis of the shaft and exposed to regions of different pressure, and pump means, preferably driven by the shaft, for maintaining a differential fluid pressure adjacent the sealing elements substantially equivalent to the pressures in the regions to which they are exposed. The sealing elements may be of any type, including the common stuffing box or gland seal.

I claim:

1. A shaft sealing device comprising a housing extending longitudinally of the shaft, a shaft seal at each end of said housing exposed to substantially different external pressures, and pumping means positioned within said housing and dividing the housing into chambers adjacent each of said shaft seals to provide differential fluid pressures in said chambers substantially equivalent to the pressures to which the respective shaft seals are externally exposed.

2. A shaft sealing device comprising a housing extending longitudinally of the shaft, a shaft seal at each end of said housing exposed to substantially different external pressures, and pumping means positioned within said housing and dividing the housing into chambers adjacent each of said shaft seals actuated by rotation of the shaft to provide differential fluid pressures in said chambers substantially equivalent to the pressures to which the respective shaft seals are externally exposed.

3. A shaft sealing device comprising a housing extending longitudinally of the shaft, a shaft seal at each end of said housing exposed to substantially different external pressures, pumping means positioned within said housing and dividing the housing into chambers adjacent each of said shaft seals actuated by rotation of the shaft to provide differential fluid pressures in said chambers substantially equivalent to the pressures to which the respective shaft seals are externally exposed, a conduit connecting said chambers, and pressure regulating means in said conduit.

4. A shaft sealing device comprising a housing extending longitudinally of the shaft, a shaft seal at each end of said housing exposed to substantially different external pressures, pumping means positioned within said housing and dividing the housing into chambers adjacent each of said shaft seals actuated by rotation of the shaft to provide differential fluid pressures in said chambers substantially equivalent to the pressures to which the respective shaft seals are externally exposed, a conduit connecting said chambers, and pressure regulating means in said conduit responsive to the higher of the pressures to which said shaft seals are externally exposed.

5. A shaft sealing device comprising a housing extending longitudinally of the shaft, a shaft seal at each end of said housing exposed to substantially different external pressures, pumping means positioned within said housing and dividing the housing into chambers adjacent each of said shaft seals actuated by rotation of the shaft to provide differential fluid pressures in said chambers substantially equivalent to the pressures to which the respective shaft seals are externally exposed, a conduit connecting said chambers, and fluid cooling means in said conduit.

6. A shaft sealing device comprising a housing extending longitudinally of the shaft having spaced fluid-containing chambers, shaft seals in each of said chambers, a pump mounted therebetween comprising a plurality of cylinders and cooperating pistons arranged about the inner circumference of said housing to provide a continuous circulation of fluid between said chambers thereby to maintain a fluid pressure differential therebetween.

7. A shaft sealing device comprising a housing extending longitudinally of the shaft having spaced fluid-containing chambers, shaft seals in each of said chambers, a pump mounted therebetween, said pump comprising a plurality of cylinders and cooperating pistons arranged about the periphery of the shaft to provide a continuous circulation of fluid between said chambers to maintain a fluid pressure differential therebetween.

8. A shaft sealing device comprising a housing extending longitudinally of the shaft having spaced fluid-containing chambers, shaft seals in each of said chambers, a pump mounted therebetween, said pump comprising a plurality of cylinders and cooperating pistons extending longitudinally of the axis of said shaft to provide a continuous circulation of fluid between said chambers to maintain a fluid pressure differential therebetween.

9. A shaft sealing device as defined in claim 1 wherein the pumping means comprises a plurality of cylinders carried by said housing, a piston in each cylinder, a cam-surfaced member mounted for rotation with the shaft, and means engaging said pistons with said cam surface to effect reciprocal motion of the pistons on rotation of the shaft.

IVAN S. BRUMAGIM.

REFERENCES CITED

The following references are of record in the file of this patent:

UNITED STATES PATENTS

| Number | Name | Date |
|---|---|---|
| 1,681,075 | Wiegert | Aug. 14, 1928 |
| 1,835,877 | Joyce | Dec. 8, 1931 |
| 580,049 | Heim et al. | Apr. 6, 1897 |
| 2,112,461 | Kohler | Mar. 29, 1938 |